United States Patent
Calamita et al.

(10) Patent No.: US 7,065,308 B2
(45) Date of Patent: Jun. 20, 2006

(54) TRANSFER ROLL ENGAGEMENT METHOD FOR MINIMIZING MEDIA INDUCED MOTION QUALITY DISTURBANCES

(75) Inventors: James P. Calamita, Spencerport, NY (US); Daniel W. Costanza, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/720,781

(22) Filed: Nov. 24, 2003

(65) Prior Publication Data

US 2005/0111861 A1    May 26, 2005

(51) Int. Cl.
*G03G 15/00* (2006.01)
*G03G 15/16* (2006.01)

(52) U.S. Cl. .................... 399/66; 399/36; 399/167
(58) Field of Classification Search ............... 399/36, 399/66, 121, 167, 297, 301
See application file for complete search history.

(56) References Cited

U.S. PATENT DOCUMENTS

| | | |
|---|---|---|
| 5,325,155 A | 6/1994 | Perry |
| 5,389,958 A | 2/1995 | Bui et al. ............... 347/103 |
| 5,610,721 A | 3/1997 | Higuchi et al. |
| 6,204,865 B1 | 3/2001 | Noguchi et al. |
| 6,421,513 B1 * | 7/2002 | Casella et al. ............ 399/162 |
| 6,731,891 B1 * | 5/2004 | Calamita et al. ........... 399/66 |

FOREIGN PATENT DOCUMENTS

JP    2003316177 A * 11/2003

OTHER PUBLICATIONS

English abstract for Japanese Patent Application No. 2002119834 from the European Patent Office.
English abstract for Japanese Patent Application No. 11365541 from the European Patent Office.

* cited by examiner

*Primary Examiner*—Arthur T. Grimley
*Assistant Examiner*—Ryan Gleitz
(74) *Attorney, Agent, or Firm*—Lloyd F. Bean, II (57) ABSTRACT

A method of maintaining a rotational velocity of an imaging drum during engagement with a transfer roll in an image producing device including: forming a nip to transfer an image from the imaging drum to media when the imaging drum is in engagement with the transfer roll; maintaining a substantially constant imaging drum rotational velocity mode during engagement with the transfer roll; sensing a lead edge of portion of the media prior to entering the nip; augmenting torque assist to increase the torque of the transfer roll when the media is in the nip for a defined period; and resuming the substantially constant imaging drum rotational velocity mode while a second portion of the media is in the nip.

5 Claims, 6 Drawing Sheets

TRANSFER ROLL ENGAGEMENT METHOD FOR MINIMIZING MEDIA INDUCED MOTION QUALITY DISTURBANCES

FIELD OF INVENTION

The present invention relates generally to a drum for fixing an ink image on a receiving medium and, more particularly, to a system and method for reducing motion quality defects while printing or copying an image.

BACKGROUND OF THE INVENTION

For printing in a solid-ink printer, a common method of applying droplets of ink onto a piece of paper is to directly print the image onto the paper, i.e., a process known as direct printing. Ink jet printing systems utilizing intermediate transfer ink jet recording methods, such as that disclosed in U.S. Pat. No. 5,389,958 entitled IMAGING PROCESS and assigned to the assignee of the present application is an example of an indirect or offset printing architecture that utilizes phase change ink. A release agent application defining an intermediate transfer surface is applied by a wicking pad that is housed within an applicator apparatus. Prior to imaging, the applicator is raised into contact with the rotating drum to apply or replenish the liquid intermediate transfer surface.

Once the liquid intermediate transfer surface has been applied, the applicator is retracted and the printhead ejects drops of ink to form the ink image on the liquid intermediate transfer surface. The ink is applied in molten form, having been melted from its solid state form. The ink image solidifies on the liquid intermediate transfer surface by cooling to a malleable solid intermediate state as the drum continues to rotate. When the imaging has been completed, a transfer roller is moved into contact with the drum to form a pressurized transfer nip between the roller and the curved surface of the intermediate transfer surface/drum. A final receiving substrate, such as a sheet of media, is then fed into the transfer nip and the ink image is transferred to the final receiving substrate.

When the transfer roller is fully engaged with the imaging drum, it may apply a load upwards of 500 lbs in a relatively short period of time. The addition and removal of such a load in such a period of time may cause the velocity of the imaging drum to deviate, resulting in a transient rotational disturbance of the drum. Additionally, there may be a steady state velocity change due to the load. The imaging drum servo control system may be insufficient to accommodate these velocity deviations, resulting in image mis-registration, or other undesirable effects, referred to as motion quality problems.

Currently, when performing marking operations that require multiple passes, the processes of forming the image on the imaging drum and transferring the image to the media are performed sequentially. The imaging must be completed before beginning the transfer process because of the motion quality problems associated with engaging the transfer roller with the imaging drum after the image has been formed on the imaging drum. As a result, productivity is limited by performing the imaging and transferring operations in series. When using an imaging drum that is large enough to hold more than one image, also referred to as a pitch, the image formed on one pitch must be transferred before an image may be formed on another pitch.

Still other aspects of the present invention will become apparent to those skilled in the art from the following description, wherein there is shown and described a preferred embodiment of this invention by way of illustration of one of the modes best suited to carry out the invention. The invention is capable of other different embodiments and its details are capable of modifications in various, obvious aspects all without departing from the invention. Accordingly, the drawings and descriptions will be regarded as illustrative in nature and not as restrictive.

BRIEF DESCRIPTION OF THE DRAWINGS

The objects, features and advantages of the invention will become apparent upon consideration of the following detailed disclosure of the invention, especially when it is taken in conjunction with the accompanying drawings wherein.

DETAILED DESCRIPTION

Figure 1:
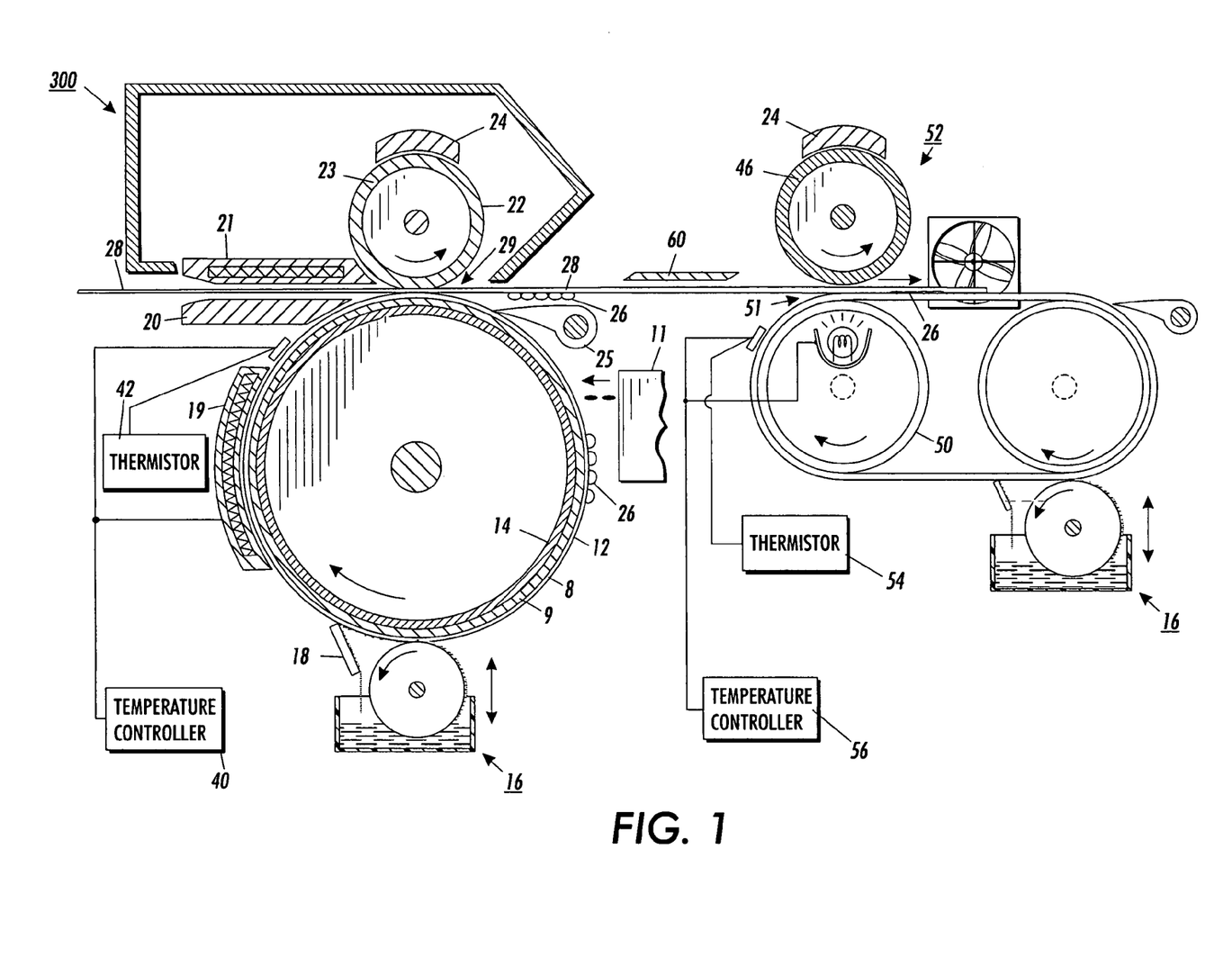
FIG. 1 is a diagrammatic illustration for applying a two-step transfix process in an ink jet printing system.

FIG. 1 discloses a diagrammatical illustration of an imaging apparatus of the present invention for applying a two-step transfix process whereby a hot melt ink is printed onto an transfer surface for transference to a receiving substrate and then transported through a fuser for post fusing. Referring to FIG. 1 wherein like numerals refer to like or corresponding parts throughout, there is shown a printhead 11 having ink jets supported by appropriate housing and support elements (not shown) for either stationary or moving utilization to deposit ink onto an intermediate transfer surface 12. The ink utilized is preferably initially in solid form and then changed to a molten state by the application of heat energy to raise the temperature from about 85 degrees to about 150 degrees centigrade. Elevated temperatures above this range will cause degradation or chemical breakdown of the ink. The molten ink is then applied in raster fashion from ink jets in the printhead 11 to the intermediate transfer surface 12 forming an ink image. The ink image is then cooled to an intermediate temperature and solidifies to a malleable state wherein it is transferred to a receiving substrate or media 28 and then post fused. The details of this process will now be more fully described below.

A supporting surface 14 which is shown in FIG. 1 has affixed an outer layer 9 defining a release surface. The intermediate transfer surface 12 is a liquid layer applied to the outer layer 9 on drum 14 by contact with an applicator assembly 16. By way of example, but not of limitation, applicator assembly 16 comprises a wicking roller impregnated with a release liquid for applying the liquid and a metering blade 18 for consistently metering the liquid on the surface of the drum 14. As the drum 14 rotates about a journalled shaft in the direction shown in FIG. 1, applicator assembly 16 is raised by the action of an applicator assembly cam and cam follower (not shown) until the wicking roller is in contact with the surface of the drum 14.

Referring once again to FIG. 1, the release liquid that forms the intermediate transfer surface 12 on outer layer 9 is heated by an appropriate heater device 19. The heater device 19 may be a radiant resistance heater positioned as shown or positioned internally within the drum 14. Heater device 19 increases the temperature of the intermediate transfer surface 12 from ambient temperature to between 25 degrees to about 70 degrees centigrade or higher to receive the ink from printhead 11. This temperature is dependent upon the exact nature of the liquid employed in the intermediate transfer surface 12 and the ink used and is adjusted by temperature controller 40 utilizing thermistor 42. Ink is then applied in molten form from about 85 degrees to about 150 degrees centigrade to the exposed surface of the liquid intermediate transfer surface 12 by the printhead 11 forming an ink image 26. The ink image 26 solidifies on the intermediate transfer surface 12 by cooling down to the malleable intermediate state temperature provided by heating device 19. A receiving substrate guide apparatus 20 then passes the receiving substrate 28, such as paper or transparency, from a positive feed device (not shown) and guides it through a nip 29. Opposing arcuate surfaces of a roller 23 and the drum 14 forms the nip 29. The roller 23 has a metallic core, preferably steel with an elastomer coating 22. The drum 14 continues to rotate, entering the nip 29 formed by the roller 22 with the curved surface of the intermediate transfer surface 12 containing the ink image 26. The ink image 26 is then deformed to its image conformation and adhered to the receiving substrate 28 by being pressed there against.

The ink image 26 is first applied to the intermediate transfer surface 12 on the outer compliant surface 8 or rigid layer 9 and then transfixed off onto the receiving substrate or media 28. The ink image 26 is thus transferred and fixed to the receiving substrate 28 by the pressure exerted on it in the nip 29 by the resilient or elastomeric surface 22 of the roller 23. By way of example only, the pressure exerted may be less than 800 lbf on the receiving substrate or media. Stripper fingers 25 (only one of which is shown) may be pivotally mounted to the imaging apparatus to assist in removing any paper or other final receiving substrate 28 from the exposed surface of the liquid layer forming the intermediate transfer surface 12. After the ink image 26 is transferred to the receiving substrate 28 and before the next imaging, the applicator assembly 16 and metering blade 18 are actuated to raise upward into contact with the drum 14 to replenish the liquid intermediate transfer surface 12.

A heater 21 may be used to preheat the receiving surface 28 prior to the fixation of the ink image 26. The heater 21 may be set to heat from between about 60 degrees to about 200 degrees centigrade. It is theorized that the heater 21 raises the temperature of the receiving medium to between about 90 degrees to about 100 degrees centigrade. However, the thermal energy of the receiving substrate 28 is kept sufficiently low so as not to melt the ink image upon transfer to the receiving substrate 28. When the ink image 26 enters the nip 29 it is deformed to its image conformation and adheres to the receiving substrate 28 either by the pressure exerted against ink image 26 on the receiving substrate 28 or by the combination of the pressure and heat supplied by heater 21 and/or heater 19. Additionally, a heater 24 may be employed which heats the transfer and fixing roller 23 to a temperature of between about 25 degrees to about 200 degrees centigrade. Heater devices 21 and 24 can also be employed in the paper or receiving substrate guide apparatus 20 or in the transfer and fixing roller 23, respectively. The pressure exerted on the ink image 26 must be sufficient to have the ink image 26 adhere to the receiving substrate 28 which is between about 10 to about 2000 pounds per square inch, and more preferably between about 750 to about 850 pounds per square inch.

After exiting the nip 29 created by the contact of the roller 23 and the outer compliant layer 9 and drum 14, the ink image can then be thermally controlled with a thermal device 60. This thermal device 60 can heat, cool, or maintain the temperature of the receiving substrate 28 and ink image 26 which may by way of example be between 50 to 100 degrees C. The highest temperature the receiving substrate 28 and ink image 26 can be increased to in this location is dependent on the melting or flash point of the ink and/or the flash point of the receiving substrate 28. The thermal device 60 could be as simple as insulation to maintain the temperature of the ink and substrate as it exits the nip 29, or a heating and/or cooling system to add or remove thermal energy. The receiving substrate 28 and ink image 26 are then transported to a fuser 52. The fuser 52 is composed of a back-up roller 46 and a fuser roller 50. The back-up roller 46 and fuser roller 50 have metallic cores, preferable steel or aluminum, and may be covered with elastomer layers 54 and 56, respectively. The back-up roller 46 engages the receiving substrate 28 and ink image 26 on the reverse side to which the ink image 26 resides. This fuses the ink image 26 to the surface of the receiving substrate 28 so that the ink image 26 is spread, flattened, penetrated and adhered to the receiving substrate 28. The pressure exerted by the fuser may be between 100 lbf to about 2000 lbf by way of example.

Now focusing the Transfer Roll Engagement Method for Minimizing Motion Quality Disturbances of the present invention will be discussed supra. When the transfer roll and the imaging drum come into contact, the transfer roll is driven preferably at a predetermined current (i.e. torque) level as disclosed in U.S. Pat. No. 6,731,891.

Figure 2:
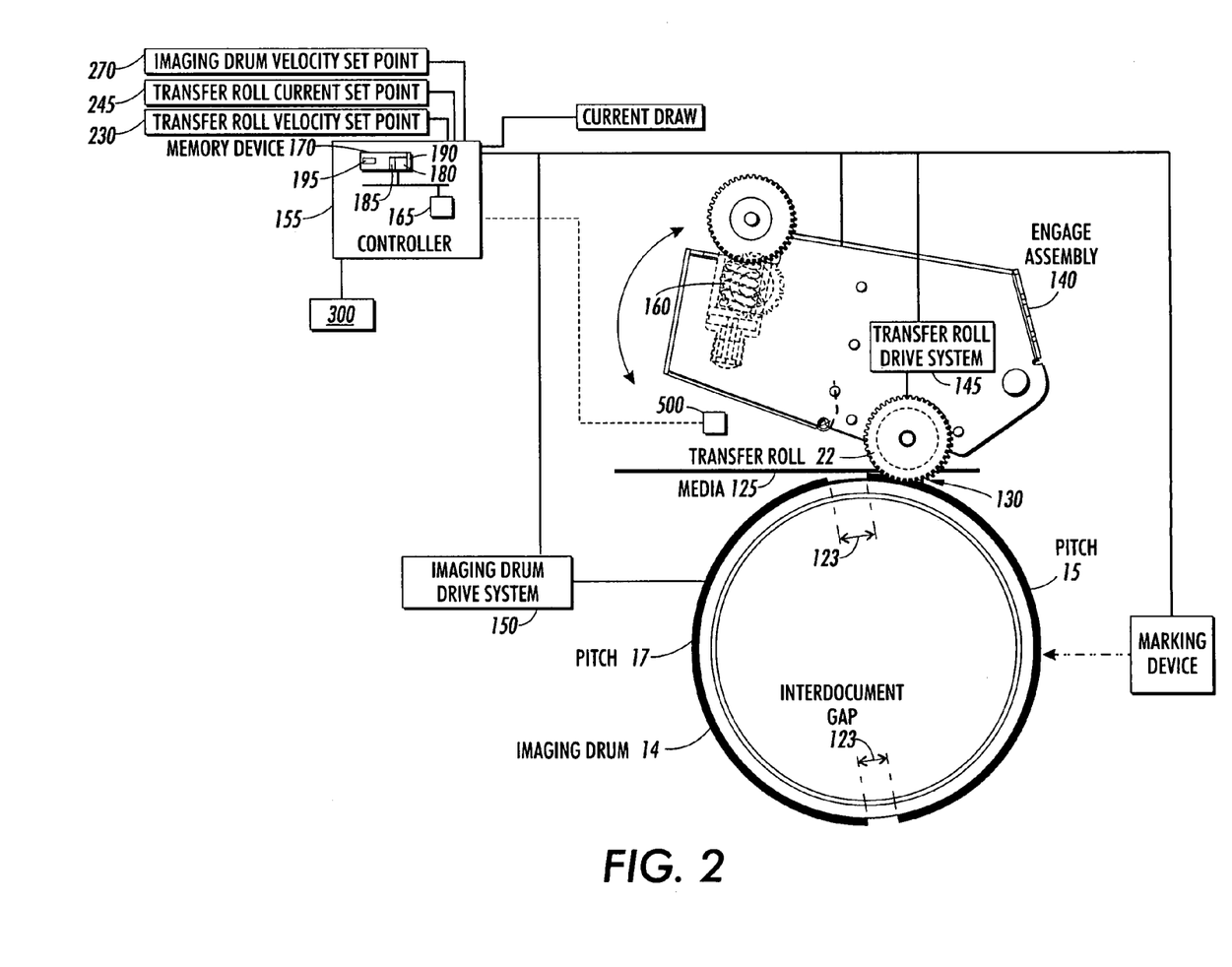
FIG. 2 is diagram of a portion of a system incorporating features of the disclosed embodiments.

Referring to FIG. 2 as discussed infra, the transfer roll system is generally adapted to cause the engagement and disengagement of a transfer roll with the imaging drum 14 during the image transfer process. The transfer roll system is generally adapted to cause the transfer roll to engage and disengage the imaging drum while maintaining a rotational velocity of the imaging drum at a nominal speed. It is a feature of the disclosed embodiments to provide a motor torque assist for the imaging drum to enable parallel imaging/transferring and reduce motion quality impacts of engagement and disengagement of the transfer roll.

Imaging drum 14 includes a first pitch 15 and a second pitch 17. The boundaries between first and second pitches 15, 17 may be defined by one or more inter-document gaps 123. Imaging drum drive system 150 operates to maintain imaging drum 14 at a substantially constant rotational velocity. Printhead 11 generally operates to apply an image on at least one pitch 15 of imaging drum 14. Printhead 11 is capable of applying an image to both pitches, 15, 17.

The transfer roll system includes a transfer roll 22, a transfer roll drive system 145, and an engagement assembly 140. Engagement assembly 140 is adapted to move transfer roll 22 into engagement with imaging drum 14 in the area of a nip 130 to transfer one or more images thereon to media 125. Media 125 may include any substrate suitable for applying images thereon and may comprise individual sheets or a continuous roll.

In the presently disclosed embodiments, one example of the motor torque assist includes measuring a drive current of imaging drum drive system 150, recording the drive current of transfer roll drive system 145 during transfer roll 22 and imaging drum 14 engagement and disengagement required to maintain the measured imaging drum drive current, and using the recorded drive current to operate transfer roll drive system 145 to minimize imaging drum velocity variations during subsequent engagement and disengagement.

Printhead 11, engagement assembly 140, transfer roll drive system 145, and imaging drum drive system 150 may be operated by a controller 155. Controller 155 may include logic circuitry for generally controlling the operation of system, and include a processor 165 that operates programs in a memory device 170. Memory device 170 may also be capable of storing data.

In one embodiment, engagement assembly 140 may include an engagement motor 160 which operates to move transfer roll 22 toward or away from imaging drum 14. Other engagement mechanisms and techniques may also be used so long as imaging drum 14 and transfer roll 22 are capable of being brought together and moved apart as described herein.

Transfer roll drive system 145 is adapted to operate at least in a constant velocity mode and a current drive mode. In the constant velocity drive mode, transfer roll drive system 145 operates to maintain transfer roll 130 substantially at a particular rotational velocity. In the current drive mode, transfer roll drive system 145 operates to drive transfer roll 130 according to a current set point.

Imaging drum drive system 150 is adapted to operate at least in a constant velocity mode, where imaging drum drive system 150 operates to maintain imaging drum 14 substantially at a particular rotational velocity.

Figure 3:
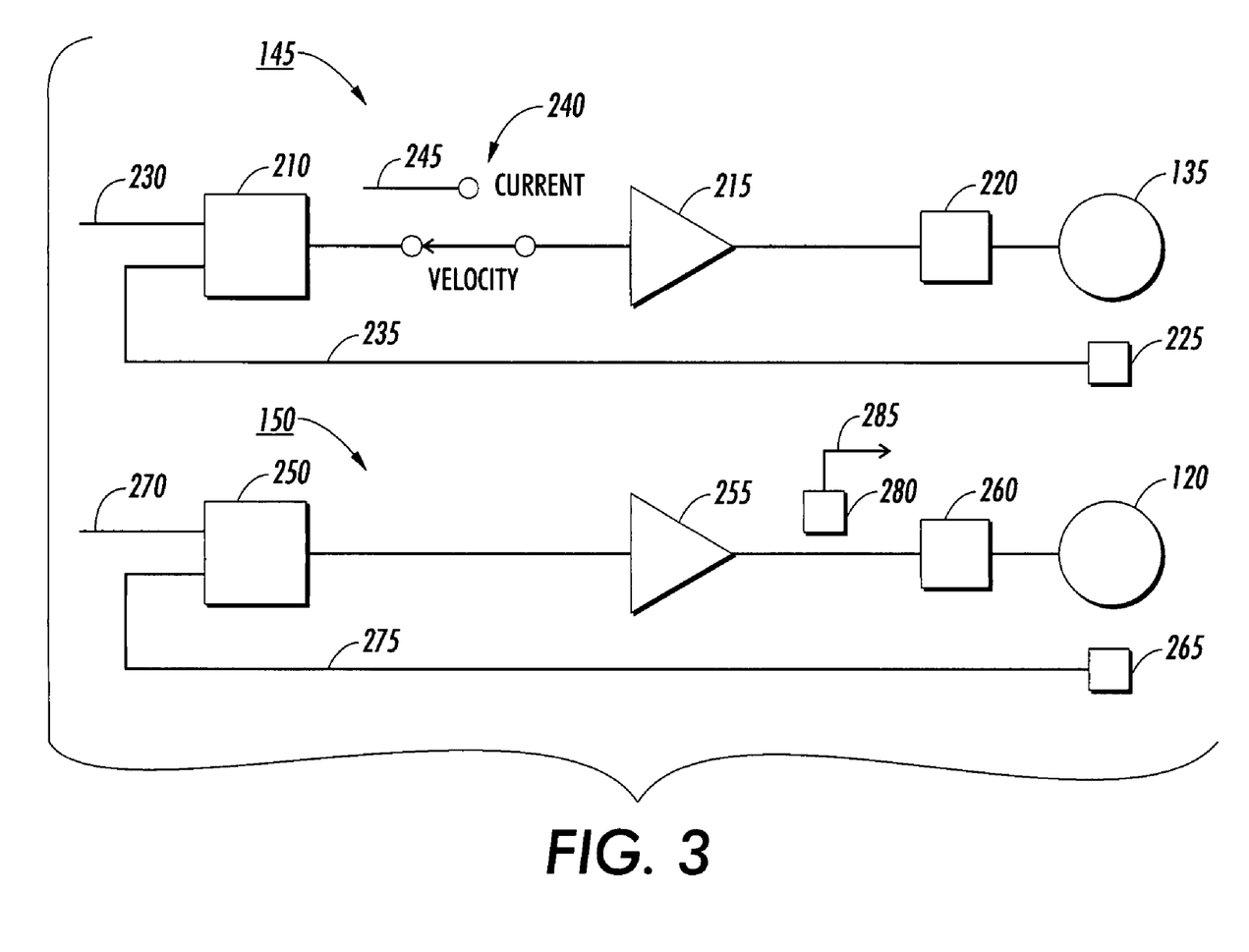
FIG. 3 is a schematic diagram of one embodiment of a transfer roll drive system and an imaging drum drive system in accordance with the disclosed embodiments.

FIG. 3 shows schematic diagrams of exemplary embodiments of transfer roll drive system 145 and imaging drum drive system 150.

Transfer roll drive system 145 is adapted to operate at least in a constant velocity mode and a current drive mode. In the constant velocity drive mode, transfer roll drive system 145 operates to maintain transfer roll 22 substantially at a particular rotational velocity. In the current drive mode, transfer roll drive system 145 operates to drive transfer roll 130 according to a current set point.

Transfer roll drive system 145 may include a transfer roll velocity servo controller 210, a transfer roll amplifier 215, a transfer roll motor 220, and a transfer roll velocity sensor 225. Controller 155 (FIG. 3) may apply a transfer roll velocity set point on signal line 230, and transfer roll velocity sensor 225 may apply a feedback signal on line 235. Transfer roll velocity servo controller 210 may then apply a signal to transfer roll amplifier 215 which in turn applies power to transfer roll motor 220.

When switch 240 is in the velocity position, transfer roll velocity servo controller 210 operates to maintain the velocity of transfer roll 22 substantially at the transfer roll velocity set point. When switch 240 is in the current position, transfer roll amplifier 215 operates as a current source, responsive to a current set point applied to signal line 245 by controller 155 (FIG. 3).

Imaging drum drive system 150 is adapted to generally operate at least in a constant velocity mode. In the constant velocity drive mode, imaging drum drive system 150 operates to maintain imaging drum 14 substantially at a particular rotational velocity. Imaging drum drive system 150 may include an imaging drum velocity servo controller 250, an imaging drum amplifier 255, an imaging drum motor 260, and an imaging drum velocity sensor 265. Controller 155 (FIG. 3) may apply an imaging drum velocity set point on signal line 270, and imaging drum velocity sensor 265 may apply a feedback signal on line 275. Imaging drum velocity servo controller 250 may then apply a signal to imaging drum amplifier 255 which in turn applies power to imaging drum motor 260. Imaging drum drive system 150 may also include a current sensor 280 for sensing the current draw of imaging drum motor 260.

During copying, printhead 11 applies a first image to pitch 15. When the first image is complete, engagement assembly 140 causes transfer roll 22 to move toward and engage imaging drum 14, forming nip 130. It is at this point that the transfer roll drive controller switches from constant velocity to constant current drive. As the lead edge of the media 125 approaches the nip 130, it is sensed by sensor 500. After a predetermined time, the torque assist controller 300 superimposes a positive pulse onto the constant current drive signal. This positive pulse is held for a predetermined time to counteract the torque disturbance imparted to the drum by the lead edge of the media. Similarly, the trail edge of the media is sensed and a negative pulse is superimposed on the constant current drive signal. After the first image is transferred to media 125, if the second image is complete, it may also be transferred to media 125 at nip 130. Otherwise, transfer roll 22 may be disengaged from imaging drum 14 when inter-document gap 123 reaches nip 130. When printhead 11 completes the second image application, transfer roll 22 and imaging drum 14 may then be re-engaged to transfer the second image to media 125. In either case, after the transfer roll is disengaged from the imaging drum, the control of the transfer roll returns to the constant velocity mode.

Engagement and disengagement of transfer roll 22 and imaging drum 14 is generally performed when inter-document gap is at or near nip 130. As mentioned above, when transfer roll 22 is fully engaged with imaging drum 14, a load in the range of approximately 500–700 lbs. may be applied to imaging drum 14. Full engagement, and thus full loading, generally occurs as inter-document gap 123 traverses nip 130, which typically takes place in approximately 50 ms. Without compensating for this load change, the velocity of imaging drum 14 will fluctuate, causing motion quality problems.

Motion quality requirements may dictate that imaging drum 14 remain within at least +/−2% of its nominal velocity. Certain techniques used to apply images to imaging drum 14 may allow for some variation in imaging drum velocity, but generally may not be able to compensate for variations significantly larger than this range.

The disclosed embodiments include driving transfer roll 22 in a manner that compensates for imaging drum velocity disturbances due to engagement and disengagement. The disclosed embodiments include a learning, or set-up procedure to record an amount of current applied to transfer roll drive system 145 to maintain a particular current draw of imaging drum drive system 150 during engagement and disengagement as shown in FIG. 4.

Figure 4:
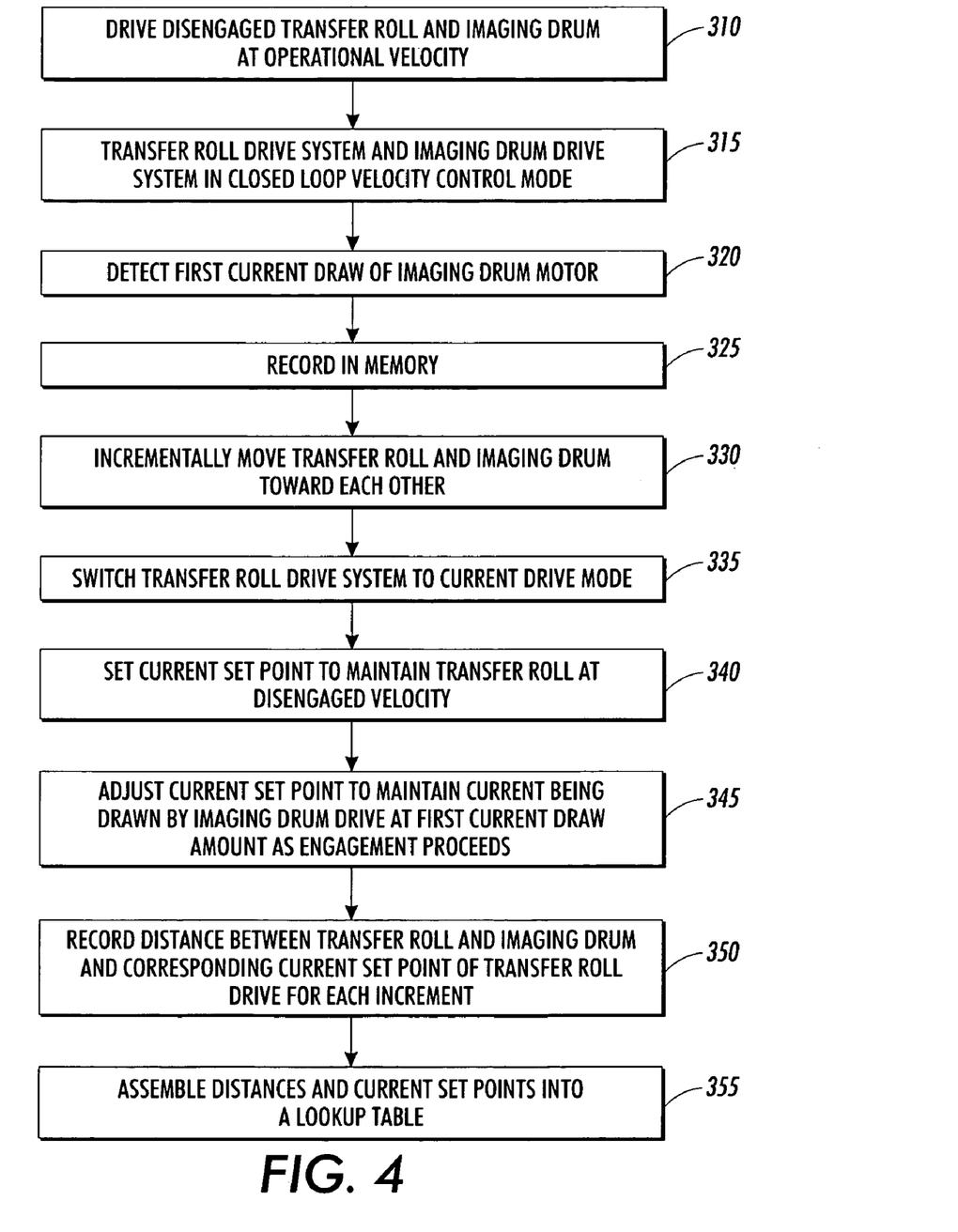
FIG. 4 is a flow chart of a learning, or set-up procedure for assembling a table for use by the transfer roll drive system during engagement and disengagement of the imaging drum and the transfer roll.

Referring to step 310 of FIG. 4, the learning procedure may begin by driving disengaged transfer roll 22 and imaging drum 14 at their respective operational velocities with transfer roll drive system 145 and imaging drum drive system 150 both in a closed loop velocity control mode (step 315). A first current draw of imaging drum motor 260 as detected by current sensor 280 (step 320) is recorded by controller 155 in memory 170 (step 325). Transfer roll 22 and imaging drum 14 are incrementally moved toward each other. For example, by operating engagement motor 160 (step 330). As transfer roll 22 and imaging drum 14 begin to engage, transfer roll drive system 145 is switched to a current drive mode (step 335) where the current set point is initially set such that transfer roll 22 maintains its disengaged velocity (step 340). The current set point of transfer roll drive system 145 is adjusted during the engagement process so that the amount of current being drawn by imaging drum drive system 150 is maintained at the first current draw amount (step 345).

As engagement motor 160 is incremented, the distance between transfer roll 22 and imaging drum 14, for example, as represented by a position of engagement motor 160, along with the corresponding current set point of transfer roll drive system 145 is recorded in memory 170 for each increment until transfer roll 22 and imaging drum 14 are completely engaged (step 350).

The distances or positions and current set points may be assembled into a first lookup table 180 that correlates an amount of load compensating drive current with a distance between transfer roll 22 and imaging drum 14 (step 355). A similar learning procedure may be implemented for the disengagement of transfer roll 22 and imaging drum 14, that is, the distance between transfer roll 22 and imaging drum 14, along with the corresponding current set point of transfer roll drive system 145 is recorded in memory 170 for each incremental movement until transfer roll 22 and imaging drum 14 are completely disengaged, and the recordations may be assembled into a second lookup table 185. Second table 185 should be similar to first table 180 generated for the engagement operation. First and second lookup tables 180, 185 may be combined to form a single lookup table 190 that may be used for both engagement and disengagement of transfer roll 22 and imaging drum 14.

Lookup table 180 may be utilized during later engagement and disengagement operations to minimize disturbances of the imaging drum velocity. For example, a subsequent marking operation may begin with transfer roll 22 and imaging drum 14 disengaged. Controller 155 may cause transfer roll drive system 145 to switch to a closed loop velocity control mode, and may cause disengaged transfer roll 22 and imaging drum 14 to operate at their respective operational velocities. Engagement motor 160 may then be successively incremented, moving transfer roll 22 toward imaging drum 14. As transfer roll 22 and imaging drum 14 begin to engage, transfer roll drive system 145 may be switched to a current drive mode. For each incremental movement, or distance between transfer roll 22 and imaging drum 14, for example, as represented by a position of engagement motor 160, the current set point for transfer roll drive system 145 is set according to look up table 180. Similarly, after image transfer is complete, during disengagement, as transfer roll 22 and imaging drum 14 are moving away from each other, the current set point for transfer roll drive system 145 for each distance between transfer roll 22 and imaging drum 14 may also be obtained from lookup table 180.

In another embodiment, lookup table 180 may be used for each engagement position and lookup table 185 may be used for each disengagement position. In still another embodiment, lookup table 190 may be used for each engagement position and disengagement position.

Returning to FIG. 2, memory device 170 may also include program storage devices 195 for storing software and computer programs incorporating the learning or setup procedure described above to execute by processor 165. The software and computer programs may be in the form of machine readable program source code. Controller 155 may be generally adapted to utilize program storage devices 195 embodying the machine readable program source code to perform the steps of the disclosed embodiments. Program storage devices 195 may include magnetic, optical, semiconductor, or any other type of suitable media.

Thus, as subsequent engagement and disengagement proceed, transfer roll 22 is driven to compensate for the load on imaging drum 14 to minimize any velocity variations that may occur as a result of the changes in load. As a result, the system compensates for both transient rotational disturbances and steady state velocity changes due to the load changes associated with engagement and disengagement. Image mis-registration and other related motion quality problems are minimized. In addition, images may be formed on one or more pitches of imaging drum 14 while other images are being transferred from other pitches to media 125. Thus, image forming and image transferring operations may be performed in parallel, increasing system productivity.

Referring back to FIG. 2, controller 155 includes a paper torque assist controller 300 is employed to maintain a constant velocity of the imaging drum when the lead edge of media enters nip 130 and when the trailing edge of the media exits nip 130. Paper torque assist controller 300 employs a pre-transfer paper sensor; sensor 500 detects when the lead edge of the media and trailing edge of the media enters the nip.

In operation, when sensor 500 detects when the lead edge of the media; paper torque assist controller generates a signal command to increase the level of current commanded to the transfer roll drive motor for a predefined period to increase the velocity or transfer roll 22. Applicants have found that additional torque is required to overcome the roll/drum separation when the lead edge initially enters the nip when the lead edge reaches a certain position the paper torque assist controller is disabled thereafter. Once the drum/roll are separated the additional torque requirement goes away. Conversely, when the trail edge of the paper leaves the nip, there will be an additional torque added to the system that causes the drum/roll to speed up until the nip closes after the paper.

As the remaining portion of the media enters the nip the torque assist controller is enabled when the trailing edge of the media is sensed by sensor 500. Torque assist controller 300 controller generates a signal command to decrease the level of current commanded to the transfer roll drive motor for a second predefined period.

Figure 5:
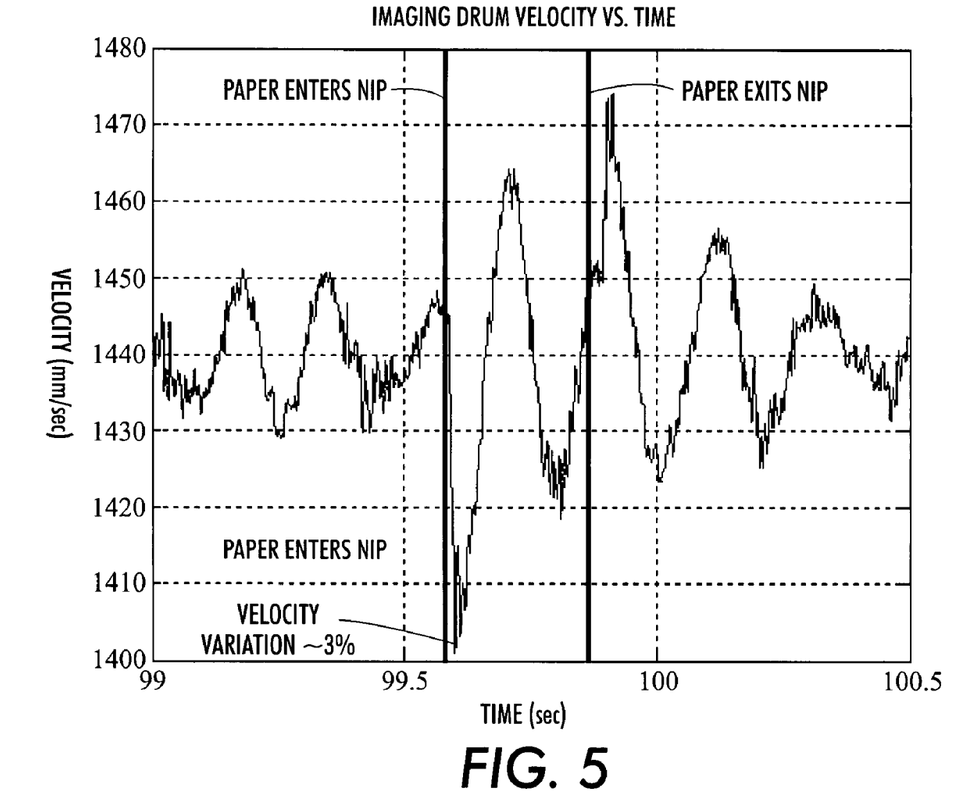
FIGS. 5–7 illustrate experimental data using the method of the present invention.

The principles of the present invention were tested. FIG. 5 illustrates Drum Velocity vs. Time for 140 um thick 90 lb media passing through closed transfix nip (740 lb load) with no paper torque assist. The drum velocity varies by ~3% due to paper entering the closed roll/drum nip. Note that the drum velocity drops when the paper enters the nip and increases when the paper exits the nip.

Figure 6:
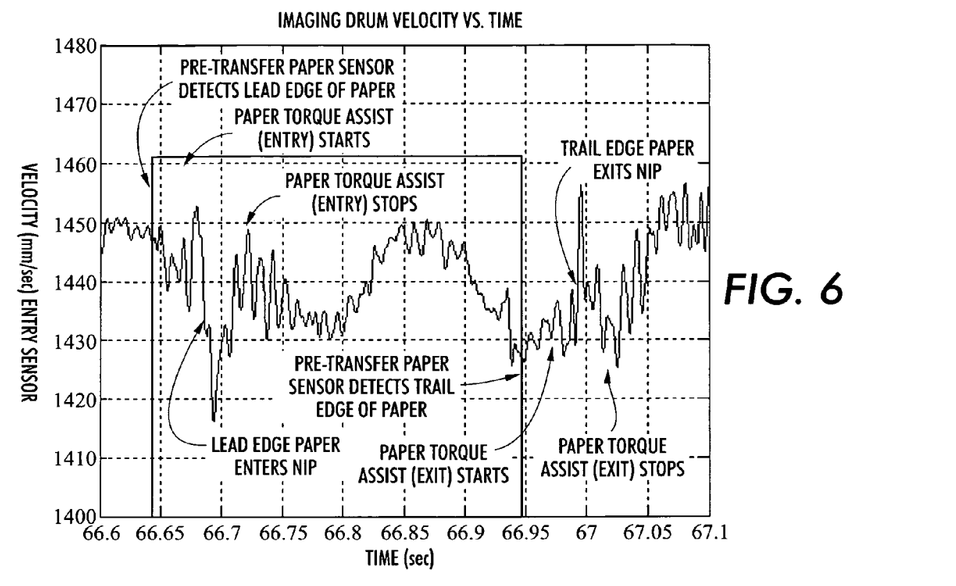
Figure 7:
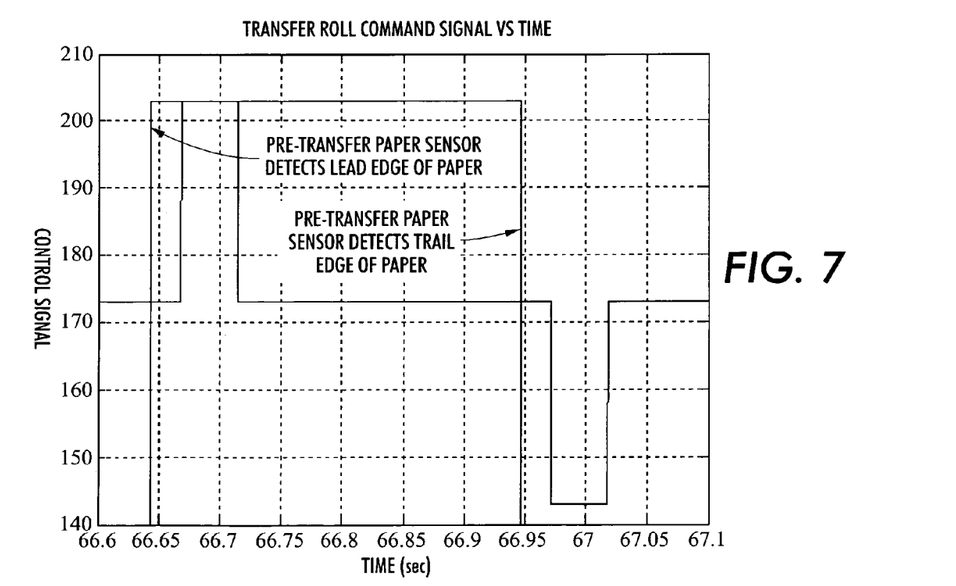

FIGS. 6–7 illustrate Drum Velocity and Transfer Roll Drive Current vs time for 140 um thick 90 lb media passing through closed transfix nip (740 lb load) with paper torque assist. Applicants have found that the velocity variation of the drum for the same paper is reduced from ~3% to ~1%—exceeding the spec of 2%. Note that the commanded signal to the transfer roll is a step function and is delayed from the signal given by the pretransfer paper sensor. Obviously, the response of the transfer roll motor to this input will have some dynamics that will affect the response of the system. This is adjusted for by changing the delay between the time when paper is detected by the pretransfer paper sensor and when the paper torque assist is started. Also notice that the step function of the paper torque assist is negative for paper leaving the nip.

The three parameters that dictate the effectiveness of the paper torque assist method are: how long before paper enters the nip should the paper torque assist be turned on, how much additional torque is required to overcome the roll/drum separation, and how long after the paper enters the nip should the additional torque be maintained.

In applicants' experiments the parameters were adjusted manually. It is evident that parameters will vary for different paper thicknesses and different drum speeds and loads. An algorithm may be employed to learn the level of torque assist required by running a few sheets of every job without paper torque assist to determine the level and timing of the disturbances. Additionally, if the type of paper is known a priori, a lookup table may be employed which has a set of predetermined parameter values.

While the invention has been described above with reference to specific embodiments thereof, it is apparent that many changes, modifications and variations in the materials, arrangements of parts and steps can be made without departing from the inventive concept disclosed herein. Accordingly, the spirit and broad scope of the appended claims is intended to embrace all such changes, modifications and variations that may occur to one of skill in the art upon a reading of the disclosure. All patent applications, patents and other publications cited herein are incorporated by reference in their entirety.

What is claimed is:

1. A method of maintaining a rotational velocity of an imaging drum during engagement with a transfer roll in an image producing device comprising:
    forming a nip to transfer an image from said imaging drum to media when said imaging drum is in engagement with the transfer roll;
    maintaining a substantially constant imaging drum rotational velocity mode during engagement with the transfer roll;
    sensing a lead edge of portion of said media prior to entering the nip;
    activating torque assist to increase the velocity of said transfer roll when said media is in said nip for a defined period;
    resuming said substantially constant imaging drum rotational velocity mode while a second portion of said media is in the nip; and
    sensing the trailing of said media prior enter the nip;
    activating torque assist to decrease the velocity of said transfer roll when said media is in said nip for a second defined period; and
    resuming said substantially constant imaging drum rotational velocity mode after said media has left the nip.

2. The method of claim 1, wherein said maintaining includes increasing and decreasing said imaging drum rotational velocity by utilizing a table based upon the media characteristics to determine the transfer roll drive current to maintain a substantially constant imaging drum rotational velocity.

3. The method of claim 1, wherein said defined period includes utilizing a table based upon the media characteristics to determine time periods to maintain a substantially constant imaging drum rotational velocity.

4. A method of maintaining a rotational velocity of an imaging drum during engagement with a transfer roll in an image producing device comprising:
    forming a nip to transfer an image from said imaging drum to media when said imaging drum is in engagement with the transfer roll;
    maintaining a substantially constant imaging drum rotational velocity mode during engagement with the transfer roll;
    sensing a lead edge of portion of said media prior to entering the nip;
    activating torque assist to increase the velocity of said transfer roll when said media is in said nip for a defined period;
    said activating torque assist includes adjusting a current set point of a transfer roll drive to maintain a substantially constant imaging drum rotational velocity when said media enters the nip; and
    resuming said substantially constant imaging drum rotational velocity mode while a second portion of said media is in the nip.

5. A method of maintaining a rotational velocity of an imaging drum during engagement with a transfer roll in an image producing device comprising:
    forming a nip to transfer an image from said imaging drum to media when said imaging drum is in engagement with the transfer roll;
    maintaining a substantially constant imaging drum rotational velocity mode during engagement with the transfer roll;
    sensing a lead edge of portion of said media prior to entering the nip;
    activating torque assist to increase the velocity of said transfer roll when said media is in said nip for a defined period;
    said activating torque assist includes adjusting a current set point of a transfer roll drive to maintain a substantially constant imaging drum rotational velocity as said media leaves the nip; and
    resuming said substantially constant imaging drum rotational velocity mode while a second portion of said media is in the nip.

* * * * *